(12) United States Patent
Covington et al.

(10) Patent No.: US 6,371,681 B1
(45) Date of Patent: Apr. 16, 2002

(54) ANTI-ROTATION CLIP

(75) Inventors: C. Ed Covington, deceased, late of Azle, by Peggy B. Covington, legal representative; Clifton B. Day, Weatherford; Joseph J. Zierer, Fort Worth, all of TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 09/400,513

(22) Filed: Sep. 20, 1999

(51) Int. Cl.[7] .................................. F16C 11/06
(52) U.S. Cl. ................................ 403/158; 244/17.11
(58) Field of Search .......................... 244/131, 17.27, 244/17.25, 17.11; 403/157, 158; 416/147, 148, 159, 149

(56) References Cited

U.S. PATENT DOCUMENTS

| | | | |
|---|---|---|---|
| 1,941,348 A | * 12/1933 | Hathorn | ...................... 244/131 |
| 2,713,806 A | * 7/1955 | Dodge | |
| 2,739,769 A | * 3/1956 | Rogers | ..................... 244/17.27 |
| 2,925,129 A | * 2/1960 | Shao Yuan et al. | ....... 244/17.25 |
| 3,107,954 A | * 10/1963 | Rudy | |
| 3,510,178 A | * 5/1970 | Sowatzke | |
| 3,635,427 A | * 1/1972 | Balke | ...................... 244/17.27 |
| 3,841,586 A | * 10/1974 | Broadley et al. | |
| 4,072,431 A | * 2/1978 | Waight et al. | |
| 4,244,677 A | * 1/1981 | Noehern et al. | |
| 4,824,326 A | * 4/1989 | Watts | |
| 5,085,315 A | * 2/1992 | Sambell | .................... 244/17.25 |
| 5,407,335 A | * 4/1995 | Caillat et al. | |
| 5,599,056 A | * 2/1997 | Schmitt | |
| 6,032,899 A | * 3/2000 | Mondet et al. | .......... 244/17.25 |
| 6,033,182 A | * 3/2000 | Rampal | |

* cited by examiner

Primary Examiner—Charles T. Jordan
Assistant Examiner—Tien Dinh
(74) Attorney, Agent, or Firm—James E. Walton; Hill & Hunn LLP

(57) ABSTRACT

The present invention is for an improved rotating control system for use on tilt rotor aircraft and helicopters. Existing rotating control systems usually include a non-rotating swashplate and a rotating swashplate, both swashplates having a plurality of clevises, each clevis formed by at least two clevis arms. The clevis arms are disposed in a clevis plane, and an axis of symmetry is located in the clevis plane between the clevis arms. The devises on the non-rotating swashplate are adapted to pivotally receive an actuator rod which has a rod axis defined by the actuator rod. The apparatus of the present invention includes an anti-rotation clip that is disposed between the clevis arms of each clevis of the non-rotating swashplate. The anti-rotation clip is either of unitary or multi-piece construction. The anti-rotation clip includes a wall portion and at least one restraining member that protrudes inwardly from the wall portion. The restraining members limit the rotation of the actuator rod about the rod axis. This feature prevents wear and structural damage to both the actuator rod and the non-rotating swashplate.

24 Claims, 6 Drawing Sheets

ANTI-ROTATION CLIP

BACKGROUND ART

1. Field of the Invention

The present invention relates generally to anti-rotation devices used to prevent wear in the rotating control systems of helicopters and tilt rotor aircraft. Specifically, the present invention relates to a method and apparatus for limiting the rotation of an actuator rod used to manipulate the non-rotating swashplate of a swashplate system. The limitation of rotation prevents wear and structural damage to the actuator rod and the non-rotating swashplate.

2. Description of Related Art

Tilt rotor aircraft are hybrids between traditional helicopters and traditional propeller driven aircraft. Typical tilt rotor aircraft have fixed wings that terminate with convertible tilt rotor assemblies that house the engines and transmissions that drive the rotors. Tilt rotor aircraft are convertible from a helicopter mode, in which the tilt rotor aircraft can take-off, hover, and land like a helicopter; to an airplane mode, in which the tilt rotor aircraft can fly forward like a fixed-wing aircraft.

Helicopters and tilt rotor aircraft use rotating control systems. A rotating control system typically consists of a rotating swashplate and a non-rotating swashplate connected by a bearing system. The rotating swashplate tracks the movements of the non-rotating swashplate, and the angle of the main rotor blades are adjusted accordingly. The non-rotating swashplate is manipulated by the pilot by way of hydraulic actuators. Each actuator rod is attached to one of several devises of the non-rotating swashplate at a spherical bearing. The spherical bearing is held in place by a bearing housing at the end of the actuator rod.

The spherical bearing permits rotational misalignment of the actuator in all axes. The misalignment of the spherical bearing is determined and controlled by inputs from the flight control system. Rotation of the actuator about its own longitudinal axis is not restricted, nor can it be limited or controlled by inputs from the flight control system. Because of this condition, the bearing housing is able to rotate within the clevis such that it comes into contact with an inner surface of the clevis. Such contact causes wear resulting in structural damage to both the clevis arms and the bearing housing. Since the clevis arms are integral to the non-rotating swashplate, damage to the clevis arms compromises the structural integrity of the non-rotating swashplate. Damage to the non-rotating swashplate causes a hazardous condition that could cause a pilot to loose control of the helicopter or aircraft.

Due to the flight-critical nature of the non-rotating swashplate, there has been a desire to minimize wear and damage to the clevis arms. The solution to the problem in the past has been to install stainless steel wear pads between the bearing housing and the clevis arms. This approach does protect the clevis but does not protect the bearing housing, which is worn because of contact with the stainless steel pads. An additional problem is that the wear pads require frequent replacement, resulting in added costs and aircraft down time.

Although the stainless steel pads adequately protect the clevis, the problem of protecting both the clevis and the actuator rod bearing housing has not been adequately resolved.

BRIEF SUMMARY OF THE INVENTION

There is a need for a tilt rotor aircraft having a rotating control system where the nonrotating swashplate clevis and actuator rod bearing housing are protected from wear and structural damage.

It is an object of the present invention to provide an anti-rotation clip for limiting the rotational freedom of an actuator rod so as to prevent contact between a bearing housing of the actuator rod and clevis arms of a clevis.

It is another object of the present invention to provide an anti-rotation clip having a sacrificial surface so as to minimize wear of the bearing housing.

It is yet another object of the present invention to provide an anti-rotation clip that prevents wear to the bearing housing and clevis arms without limiting the rotational misalignment capability of the spherical bearing.

It is yet another object of the present invention to provide an anti-rotation clip made of multipart construction, the multiple parts being assembled during installation of the clip into the clevis.

It is yet another object of the present invention to provide an anti-rotation clip made of unitary construction, the clip being adapted to be installed by compressing the sides of the clip, locating the clip in the clevis, and releasing the clip so that it snaps back to its original shape.

It is yet another object of the present invention to provide a method of preventing wear and structural damage in a rotating control system, whereby an anti-rotation clip is installed by compressing the sides of the clip, locating the clip in the clevis, and releasing the clip so that it snaps back to its original shape.

A principle advantage of the present invention is that the anti-rotation clip limits rotation of an actuator rod, thereby eliminating wear between a bearing housing and a swashplate clevis.

Another advantage of the present invention is that the anti-rotation clip, unlike prior art stainless steel wear pads, protects the flight-critical swashplate clevis and provides a sacrificial surface in order to prevent wear or damage to the bearing housing of the actuator rod.

Another advantage of the present invention is that in a multipart anti-rotation clip embodiment, the clip may be installed in certain applications without dismantling the actuator rod from the clevis arms.

The above objects, features, and advantages of the anti-rotation clip as well as additional objects, features, and advantages of the invention will become apparent in the following detailed description.

DETAILED DESCRIPTION OF THE PREFERRED EMBODIMENT

Figure 1:
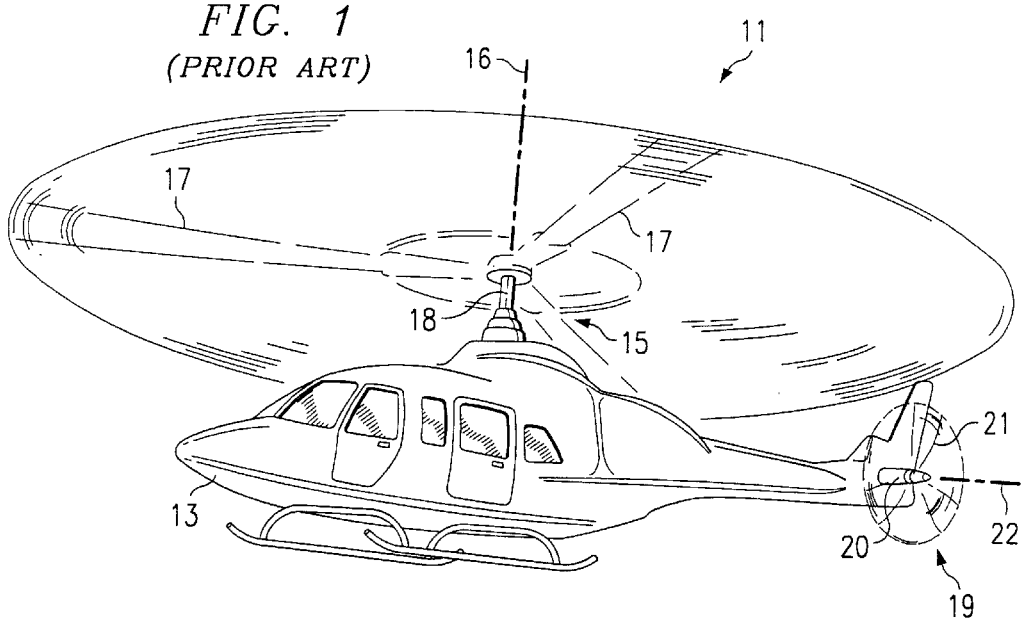
FIG. 1 is a perspective view of a helicopter implementing an anti-rotation clip according to the present invention.

Referring to FIG. 1 in the drawings, a typical helicopter 11 is illustrated. Helicopter 11 has an airframe 13, a main rotor assembly 15 including main rotor blades 17 and a main rotor shaft 18, and a tail rotor assembly 19 including tail rotor blades 21 and a tail rotor shaft 20. Main rotor blades 17 generally rotate about a longitudinal axis 16 of main rotor shaft 18. Tail rotor blades 21 generally rotate about a longitudinal axis 22 of tail rotor shaft 20. Helicopter 11 can take-off, hover, rotate, fly with a designated heading, and land.

Figure 2A:
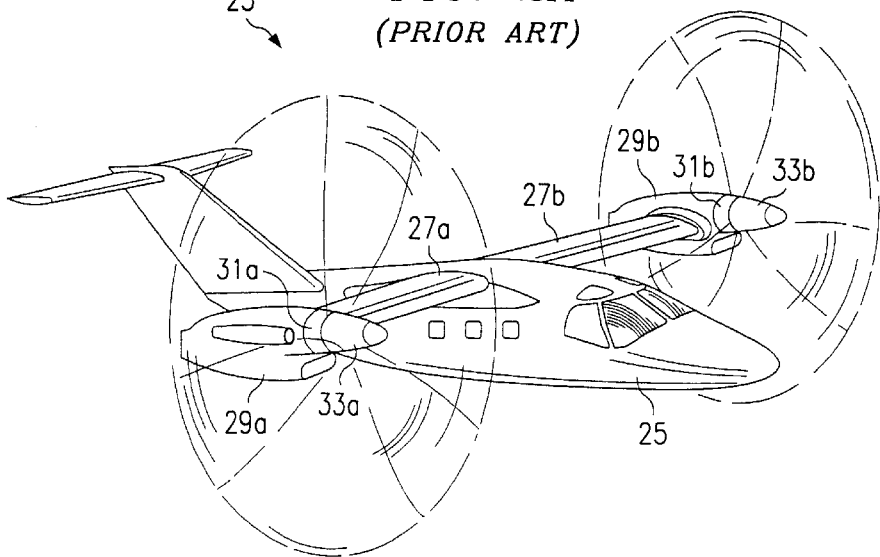
FIG. 2A is a perspective view of a tilt rotor aircraft in an airplane mode implementing the anti-rotation clip according to the present invention.
Figure 2B:
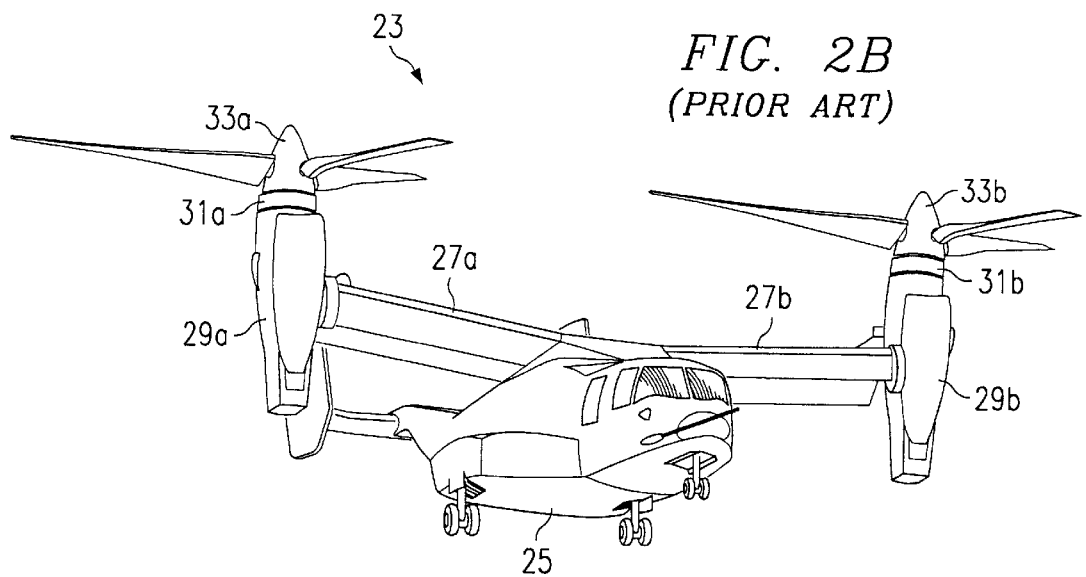
FIG. 2B is a perspective view of a tilt rotor aircraft in a helicopter mode implementing the anti-rotation clip according to the present invention.

Referring now to FIGS. 2A and 2B in the drawings, an aircraft able to perform similar functions is a tilt rotor aircraft 23. Tilt rotor aircraft 23 has an airframe 25 and wings 27a and 27b coupled to airframe 25. As is conventional, wings 27a and 27b terminate with tilt rotor assemblies 29a and 29b, respectively. Tilt rotor assemblies 29a and 29b each generally include an engine, a transmission and gear box for driving rotor shafts 31a and 31b and prop-rotors 33a and 33b, and a conversion actuator for actuating tilt rotor assemblies 29a and 29b between an airplane mode, as illustrated in FIG. 2A, and a helicopter mode, as illustrated in FIG. 2B. In the airplane mode, tilt rotor aircraft 23 can be flown and operated like a conventional fixed-wing propeller driven aircraft. In the helicopter mode, tilt rotor aircraft 23 can take-off, hover, land, and be operated like a conventional rotary wing aircraft or helicopter.

Figure 3:
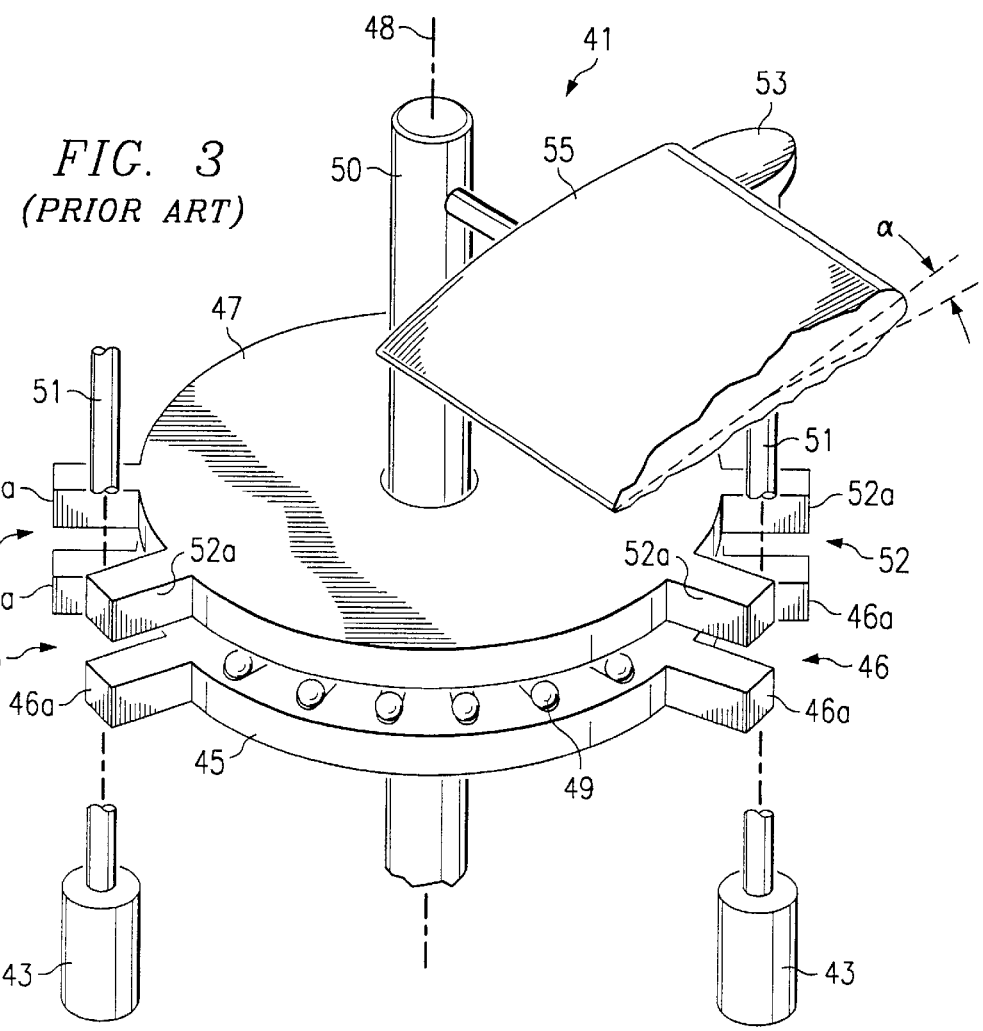
FIG. 3 is a perspective view of a rotating control system used on the helicopter of FIG. 1 and the tilt rotor aircraft of FIGS. 2A and 2B having a rotating swashplate and a non-rotating swashplate, both swashplates having a plurality of clevises.

Referring now to FIG. 3 in the drawings, both helicopter 11 and tilt rotor aircraft 23 use rotating control systems, or swashplate systems 41. Swashplate system 41 can be either of original manufacture or an existing swashplate system that is being used on an aircraft. Although swashplate system 41 design varies, a typical swashplate system 41 uses at least one hydraulic actuator 43 to manipulate a non-rotating swashplate 45. Non-rotating swashplate 45 includes a plurality of devises 46, each clevis 46 formed by a pair of clevis arms 46a. Clevis arms 46a are adapted to pivotally receive hydraulic actuator 43. The position of hydraulic actuator 43 is determined by a pilot input during typical flight maneuvers.

Non-rotating swashplate 45 is free to rotate about any horizontal, in-plane axis that intersects a longitudianl axis 48 of rotor shaft 50, whereby rotor shaft 50 is similar to main rotor shaft 18 (FIG. 1), tail rotor shaft 20 (FIG. 1), and rotor shafts 31a and 31b (FIGS. 2A and 2B). Such rotation will be referred to herein as "out-of-plane" rotation. Hydraulic actuator 43 causes non-rotating swashplate 45 to experience out-of-plane rotation, which causes a rotating swashplate 47 to experience the same out-of-plane rotation. Rotating swashplate 47 is also free to rotate in a plane parallel to non-rotating swashplate 45 about longitudinal axis 48. Such rotation shall be referred to herein as "in-plane" rotation. A bearing system 49 is disposed between rotating swashplate 47 and non-rotating swashplate 45.

Rotating swashplate 47 includes a plurality of clevises 52, each clevis 52 formed by a pair of clevis arms 52a. Clevis arms 52a are adapted to pivotally receive a pitch, link 51 for each of a plurality of main rotor blades 55.

As non-rotating swashplate 45 is actuated, non-rotating swashplate 45 and rotating swashplate 47 experience out-of-plane rotation. The out-of-plane rotation by rotating swashplate 47 manipulates pitch link 51 connected to a pitch horn 53 for each of a plurality of main rotor blades 55. Pitch horn 53 extends or retracts based on the out-of-plane rotation of rotating swashplate 47, thereby adjusting an angle $\alpha$ of main rotor blade 55.

Figure 4A:
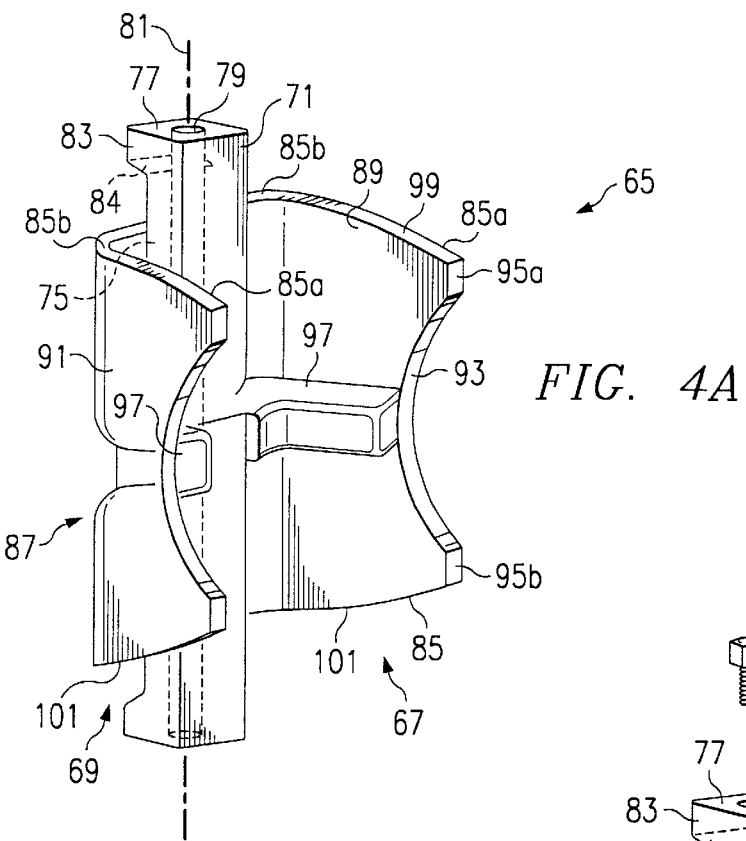
FIG. 4A is an assembled perspective view of the anti-rotation clip according to the present invention.
Figure 4B:
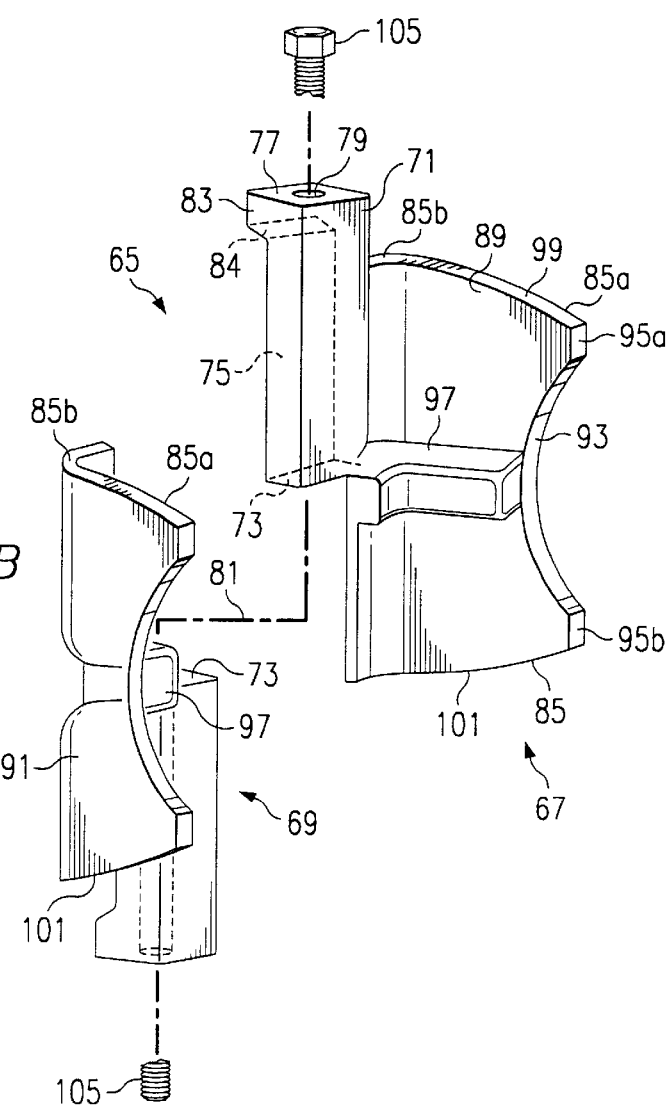
FIG. 4B is an exploded perspective view of the anti-rotation clip of FIG. 4A.

Referring now to FIGS. 4A and 4B in the drawings, the preferred embodiment of an anti-rotation clip 65 according to the present invention is illustrated. Anti-rotation clip 65 is a multipart device having at least a top, or first portion 67 and a bottom, or second portion 69. Hereinafter, it should be understood that top portion 67 is identical in form and function to bottom portion 69. In the preferred embodiment, top portion 67 and bottom portion 69 are made from nylatron. However, the material composition of anti-rotation clip 65 could be any wear resistant material.

Top portion 67 includes a generally rectangular center channel 71 having a bottom surface 73, a rear surface 75, and a top surface 77. Bottom surface 73 of center channel 71 of top portion 67 is adapted to mate with the corresponding bottom surface 73 of center channel 71 of bottom portion 69. Center channel 71 includes a longitudinally extending aperture 79 that extends from top surface 77 to bottom surface 73 along a longitudinal axis 81.

A flange 83 extends rearward from rear surface 75 of center channel 71. Flange 83 includes a lower flange surface 84 that is generally tapered toward top surface 77 as lower flange surface 84 extends rearwardly from center channel 71.

Top portion 67 also includes a side member 85. Side member 85 includes a planar portion 85a that is generally perpendicular to rear surface 75. Side member 85 also includes a generally rounded corner portion 85b that is integrated with planar portion 85a. Corner portion 85b is integrated with and flushly connected to rear surface 75. Although planar portion 85a is shown to be generally perpendicular to rear surface 75, it should be understood that planar portion 85a may form angles other than right angles with rear surface 75 depending on the angle of the clevis into which anti-rotation clip 65 is installed, as will be explained in more detail below.

Planar portion 85a includes an arcuate cutout 93 forming legs 95a and 95b, leg 95a having an upper leg surface 99 and leg 95b having a lower leg surface 101. Upper leg surface 99 and lower leg surface 101 taper toward one another as planar portion 85a extends outward from corner portion 85b.

When top portion 67 and bottom portion 69 are combined, a wall portion 87 is formed that is made up of both center channels 71 and both side members 85. Wall portion 87 includes an inner surface 89 and an opposing outer surface 91. Inner surface 89 includes a restraining member 97 that protrudes inwardly and perpendicularly from planar portion 85a and radially inwardly from corner portion 85b. Thus, restraining member 97 extends transverse to longitudinal axis 81. Restraining member 97 is generally rectangular in cross section, although this shape could vary according to the application in which apparatus is used.

Referring specifically to FIG. 4B in the drawings, the method of joining top portion 67 and bottom portion 69 is illustrated. Bottom surfaces 73 of each center channel 71 are adapted to mate with the other. A connecting member 105 passes through apertures 79 to releasably join top portion 67 and bottom portion 69. The use of a multipart anti-rotation clip 65 allows anti-rotation clip 65 to be easily installed during original installation and easily replaced during periodic maintenance periods.

Figure 5A:
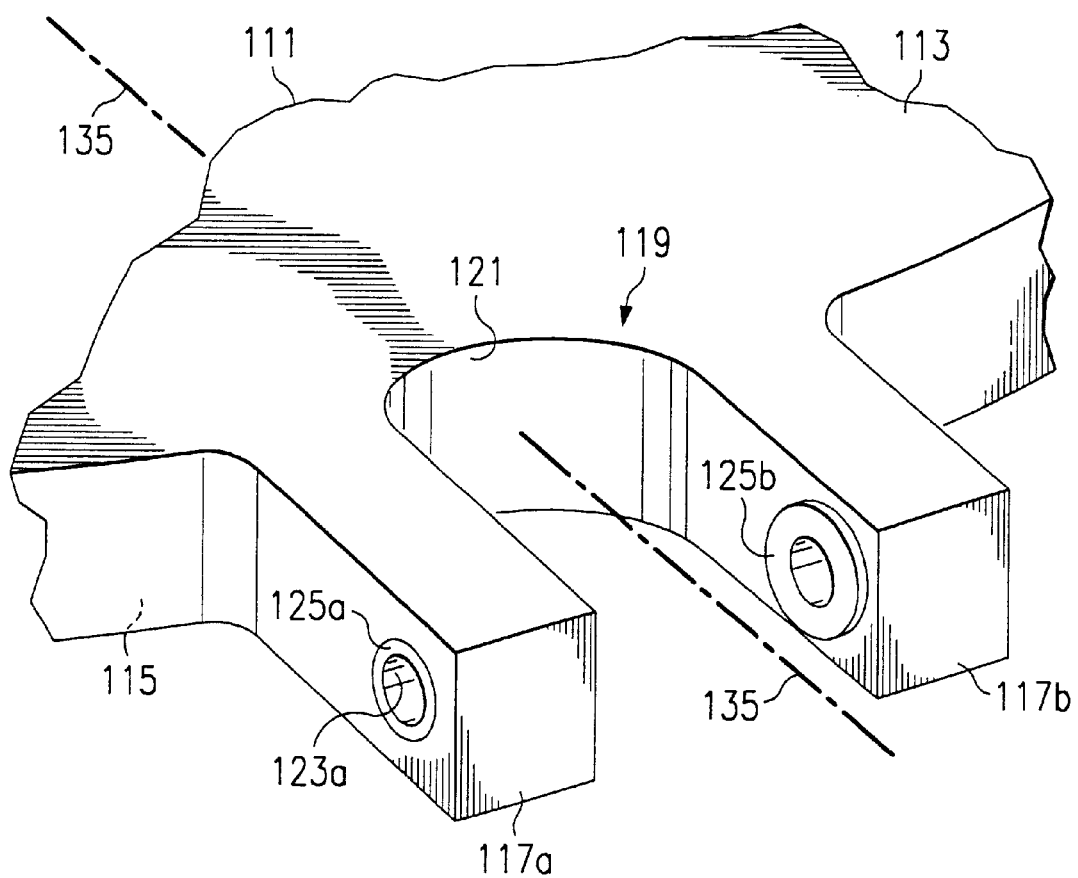
FIG. 5A is an enlarged perspective view of one of the devises located on the non-rotating swashplate of FIG. 3.
Figure 5B:
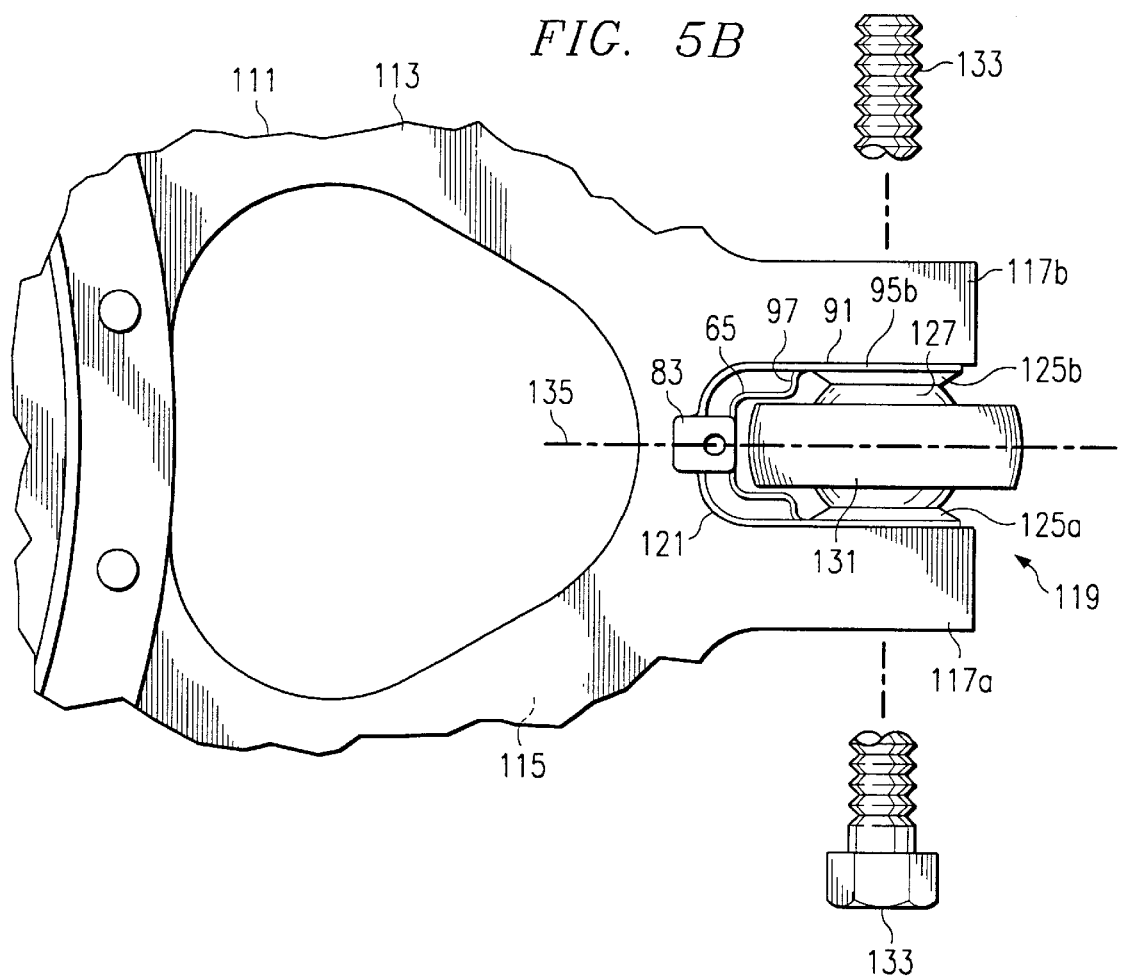
FIG. 5B is an assembled top view of the anti-rotation clip of FIG. 4A installed in the clevis of FIG. 5A.
Figure 5C:
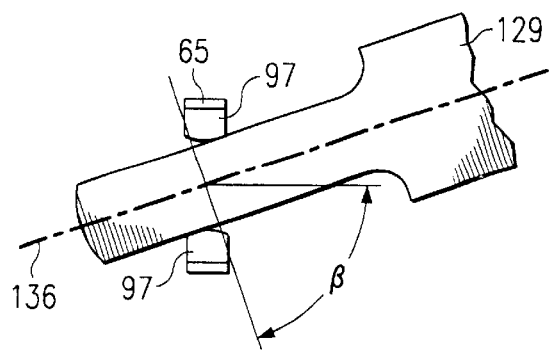
FIG. 5C is a partial side view of the assembled anti-rotation clip of FIG. 5B showing how the anti-rotation clip allows rotation of an actuator rod about some axes while limiting rotation about other axes.

Referring now to FIGS. 5A, 5B, and 5C in the drawings, the assembly containing the preferred embodiment of the present invention is illustrated. FIGS. 5A and 5B illustrate a nonrotating swashplate 111 having an upper surface 113 and a lower surface 115. Swashplate 111 is similar to non-rotating swashplate 45. Non-rotating swashplate 111 also includes clevis arms 117a and 117b which are preferably parallel and form a typically U-shaped clevis 119. Although clevis arms 117a and 117b are shown as being parallel, it is not necessary that clevis arms 117a and 117b be parallel. However, it is preferred that clevis arms 117a and 117b extend outward from non-rotating swashplate 111 in a common clevis plane. An axis of symmetry 135 is disposed in the clevis plane between clevis arms 117a and 117b.

Non-rotating swashplate 111 includes a clevis 119 for each rotor blade 55 (see FIG. 3). Clevis 119 includes an inner surface 121. Clevis arm 117a includes an aperture 123a passing therethrough that is aligned with a corresponding aperture (not shown) passing through clevis arm 117b. Aperture 123a and the corresponding aperture through clevis arm 117b contain conventional bushings 125a and 125b which are adapted to engage a conventional spherical bearing 127 at the end of an actuator rod 129. Spherical bearing 127 allows rotational misalignment of actuator rod 129 in all axes. Spherical bearing 127 is radially constrained by a bearing housing 131 located at the end of actuator rod 129. A connecting pin 133 passes through aperture 123a, spherical bearing 127, and the corresponding aperture through clevis arm 117b, thereby pivotally attaching actuator rod 129 to non-rotating swashplate 111.

Anti-rotation clip 65 is installed between clevis arms 117a and 117b. As explained previously, outer surface 91 of anti-rotation clip 65 is adapted to mate with inner surface 121 of clevis 119. Legs 95a and 95b are adapted to concentrically surround bushings 125a and 125b. Lower flange surfaces 84 of flanges 83 of anti-rotation clip 65 are adapted to mate with upper surface 113 and lower surface 115 of non-rotating swashplate 111. Flanges 83 can be adapted to prevent translation of anti-rotation clip 65 along longitudinal axis 81. However, this is not a necessary feature of flanges 83.

Referring specifically to FIGS. 5B and 5C in the drawings, the primary function of the present invention is illustrated. As is shown, anti-rotation clip 65 is installed in clevis 119 of non-rotating swashplate 111. Actuator rod 129, which includes spherical bearing 127 and bearing housing 131, is fastened between clevis arms 117a and 117b. Actuator rod 129 defines a rod axis 136 which extends axially along actuator rod 129. Upon input from the pilot, actuator rod 129 extends or retracts which causes out-of-plane rotation of non-rotating swashplate 111. Although out-of-plane rotation is needed to control the aircraft, excessive rotation of actuator rod 129 about rod axis 136 is not desired because the rotation about rod axis 136 causes bearing housing 131 to impact inner surface 121 of clevis 119 causing wear and structural damage to both bearing housing 131 and clevis 119 of non-rotating swashplate 111. Axis of symmetry 135 shown in FIG. 5B intersects rod axis 136 and is perpendicular to the view shown in FIG. 5C.

The primary function of anti-rotation clip 65 is to limit the rotation of actuator rod 129 about rod axis 136, thereby eliminating or substantially reducing wear and structural damage. Restraining members 97 limit the rotation of actuator rod 129 about rod axis 136, while allowing actuator rod 129 to rotate about axis of symmetry 135. As shown in FIG. 5C, restraining members 97 allow actuator rod 129 to rotate about axis of symmetry 135 up to an angle B. This rotation is necessary for proper manipulation of non-rotating swashplate 111, but the limitation of rotation about rod axis 136 prevents bearing housing 131 from impacting non-rotating swashplate 111. Angle $\beta$ varies according to the overall control system design.

Figure 6A:
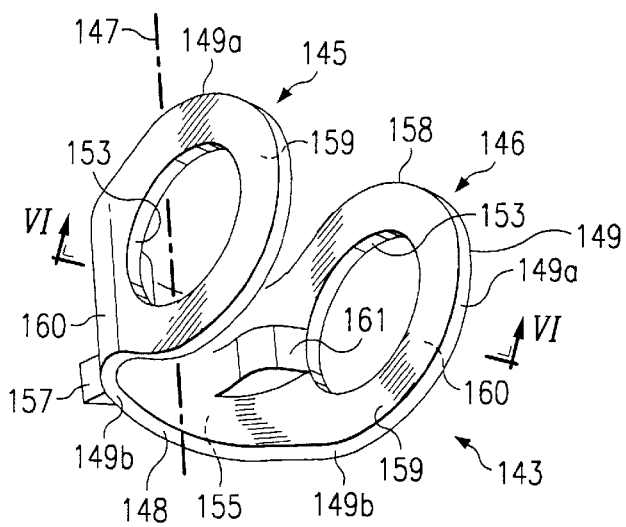
FIG. 6A is a perspective view of an alternate embodiment of the anti-rotation clip according to the present invention.

Referring now to FIG. 6A in the drawings, an alternate embodiment of the present invention is illustrated. Unlike the preferred embodiment, an anti-rotation clip 143 is made of unitary construction. Anti-rotation clip 143 is preferably made from nylatron. However, the material composition of anti-rotation clip 143 could be any wear resistant material.

Anti-rotation clip 143 includes a left portion 145 and a right portion 146. Left portion 145 is a mirror image of right portion 146 about a longitudinal axis 147. Because right portion 146 is identical in form and function to left portion 145, the following discussion pertaining to right portion 146 is equally applicable to left portion 145.

Right portion 146 includes a back member 148 and a side member 149. Side member 149 includes a planar portion 149a that is generally perpendicular to back member 148. Side member 149 also includes a generally rounded corner portion 149b that is integrated with planar portion 149a. Corner portion 149b is integrated with and flushly connected to back member 148. Although planar portion 149a is shown to be generally perpendicular to back member 148, it should be understood that planar portion 149a may form angles other than right angles with back member 148 depending on the angle of the clevis into which anti-rotation clip 143 is installed, as will be explained below in more detail.

Planar portion 149a extends outwardly from corner portion 149b into a generally arcuate shape. An aperture 153 passes through planar portion 149a, aperture 153 being concentrically located with respect to the arcuate shape of planar portion 149a. Back member 148 includes a rear surface 155. A stabilization member 157 protrudes rearward from rear surface 155. Stabilization member 157 is generally cubic in shape, although stabilization member 157 could be of various shapes.

Left portion 145 and right portion 146 together form a wall portion 158 having an inner surface 159 and an opposing outer surface 160. Inner surface 159 includes a restraining member 161 that protrudes inwardly and perpendicularly from planar portion 149a and radially inwardly from corner portion 149b. Thus, restraining member 161 extends transverse to longitudinal axis 147. Restraining member 161 terminates at aperture 153. Restraining member 161 is generally rectangular in cross section, although this shape could vary according to the application in which the apparatus is used.

Figure 6B:
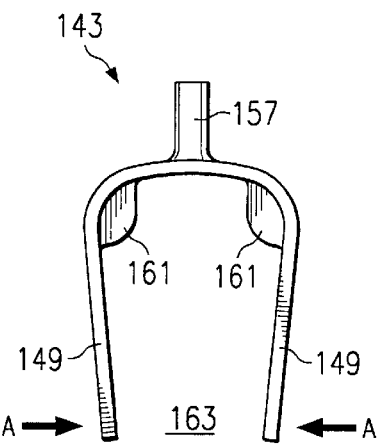
FIG. 6B is a top view of the anti-rotation clip of FIG. 6A in a compressed position.
Figure 6C:
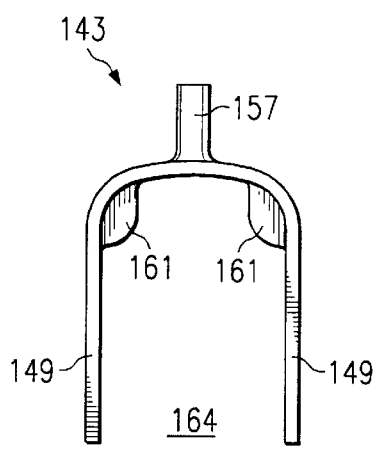
FIG. 6C is a top view of the anti-rotation clip of FIG. 6A in a normal position.
Figure 6D:
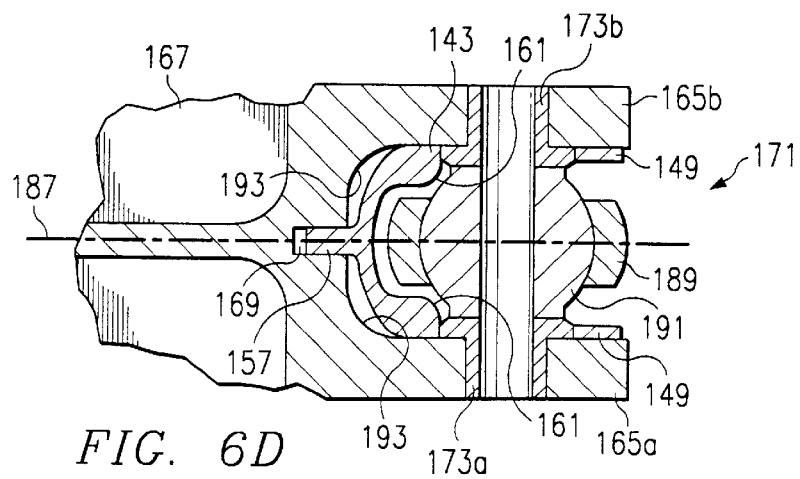
FIG. 6D is a cross-sectional top view taken at VI—VI of the anti-rotation clip of FIG. 6A installed in a clevis of a non-rotating swashplate similar to the clevis of FIG. 5A.

Referring now to FIGS. 6B, 6C, and 6D in the drawings, the installation and function of anti-rotation clip 143 is illustrated. Because of the unitary construction, installation of anti-rotation clip 143 is different than that of the preferred embodiment. Anti-rotation clip 143 is adapted to be placed in two different positions. A first position, or a compressed position 163 is accomplished by directing a compressive force A to outer surface 160 of each side member 149. Force A causes side members 149 to compress toward each other, thereby achieving compressed position 163 (see FIG. 6B). A second position, or normal position 164 is achieved when no force is applied to side members 149 (see FIG. 6C). Anti-rotation clip 143 is usually in normal position 164.

The installation process is accomplished by placing anti-rotation clip 143 in compressed position 163. While maintaining compressed position 163, anti-rotation clip 143 is placed between clevis arms 165a and 165b of a clevis 171 of a non-rotating swashplate 167. Non-rotating swashplate 167 is similar in form and function to non-rotating swashplate 45. Stabilization member 157 is received by a small recess 169 in clevis 171. Clevis 171 is different from previously described devises because of the presence of recess 169. Following insertion of anti-rotation clip 143, side members 149 are released, thereby allowing clip 143 to return to normal position 164. Once anti-rotation clip 143 has been installed, apertures 153 of side members 149 surround bushings 173a and 173b located in clevis 171.

Referring specifically to FIG. 6D in the drawings, the function of anti-rotation clip 143 is essentially the same as that of the preferred embodiment. Restraining member 161 is used to limit the rotation of an actuator rod (not shown) about an actuator rod axis (not shown), while allowing rotation about an axis of symmetry 187. Axis of symmetry 187 intersects actuator rod axis (not shown), actuator rod axis being perpendicular to the view shown in FIG. 6D. Restraining member 161 prevents a bearing housing 189, which houses a spherical bearing 191, from impacting an inner surface 193 of clevis 171. This prevents wear and structural damage to both bearing housing 189 and clevis 171 of non-rotating swashplate 167.

It should be apparent from the foregoing that an invention having significant advantages has been provided. While the invention is shown in only one of its forms, it is not just limited but is susceptible to various changes and modifications without departing from the spirit thereof. It should further be understood that the present invention is not limited to uses on helicopters and tilt rotor aircraft, but also includes uses on any aircraft using rotating control systems. Additionally, the anti-rotation clip can be used in any application to limit the rotation of an actuator, rod or linkage that is attached between two clevis arms.

We claim:

1. An improved aircraft comprising:
   an airframe;
   a rotating control system carried by the airframe, the rotating control system comprising:
      a member having at least one clevis defined by a pair of clevis arms disposed in a clevis plane, the at least one clevis having an axis of symmetry disposed in the clevis plane midway between the pair of clevis arms;
      a shaft member pivotally coupled between the pair of clevis arms, the shaft member having a shaft axis, the shaft axis disposed axially along the shaft member; and
      an anti-rotation member for limiting a rotation of the shaft member about the shaft axis, the anti-rotation member having at least one restraining member that protrudes toward the shaft member for limiting the axial rotation of the shaft member;
   wherein the anti-rotation member is a multi-piece clip comprising:
      a first portion having a center channel, a side member, and a restraining member, the side member having a planar portion and a corner portion, the corner portion being integrated with the center channel and the planar portion, the side member having an inner surface, the restraining member protruding inwardly from the inner surface of the side member; and
      a second portion identical to the first portion.

2. The improved aircraft according to claim 1, wherein the improved aircraft is a helicopter.

3. The improved aircraft according to claim 1, wherein the improved aircraft is a tilt rotor aircraft.

4. The improved aircraft according to claim 1, wherein the shaft member is a hydraulic actuator rod.

5. The improved aircraft according to claim 1, wherein the anti-rotation member is made of nylatron.

6. A rotating control system comprising:
   a member having at least one clevis defined by a pair of clevis arms disposed in a clevis plane, the at least one clevis having an axis of symmetry disposed in the clevis plane midway between the pair of clevis arms;
   a shaft member pivotally coupled between the pair of clevis arms, the shaft member having a shaft axis, the shaft axis disposed axially along the shaft member; and
   an anti-rotation member for limiting a rotation of the shaft member about the shaft axis, the anti-rotation member having at least one restraining member that protrudes toward the shaft member for limiting axial rotation of the shaft member about the shaft axis;
   wherein the anti-rotation member is a multi-piece clip comprising:
      a first portion having a center channel, a side member, and a restraining member, the side member having a planar portion and a corner portion, the corner portion being integrated with the center channel and the planar portion, the side member having an inner surface, the restraining member protruding inwardly from the inner surface of the side member; and
      a second portion identical to the first portion.

7. The rotating control system according to claim 6, wherein the shaft member is a hydraulic actuator rod.

8. The rotating control system according to claim 7, wherein the hydraulic actuator rod comprises an extensible shaft terminating with a spherical bearing carried by a bearing housing.

9. The rotating control system according to claim 6, wherein the anti-rotation member is made of nylatron.

10. A rotating control system comprising:
   a member having at least one clevis defined by a pair of clevis arms disposed in a clevis plane, the at least one clevis having an axis of symmetry disposed in the clevis plane midway between the pair of clevis arms;
   a shaft member pivotally coupled between the pair of clevis arms, the shaft member having a shaft axis, the shaft axis disposed axially along the shaft member; and
   an anti-rotation member for limiting a rotation of the shaft member about the shaft axis, the anti-rotation member having at least one restraining member that protrudes toward the shaft member for limiting axial rotation of the shaft member about the shaft axis;
   wherein the anti-rotation member is a multi-piece clip comprising:

a first portion having a center channel, a side member, and a restraining member, the side member having a planar portion and a corner portion, the corner portion being integrated with the center channel and the planar portion, the planar portion having an arcuate cutout forming at least one leg;

a second portion identical to the first portion;

the center channel of the first portion and the center channel of the second portion each having a bottom surface and a top surface;

the bottom surface of the center channel of the first portion being adapted to mate with the bottom surface of the center channel of the second portion;

each center channel having an aperture extending from the top surface to the bottom surface such that the apertures align upon mating of the first portion and the second portion;

each aperture adapted to receive a connecting member such that the first portion and the second portion are releasably connected; and the first portion and the second portion combining to form an inner surface, each restraining member protruding inwardly from the inner surface.

11. An anti-rotation clip for restraining the rotation of a shaft, the anti-rotation clip comprising:

a wall portion; and a restraining member protruding inwardly from the wall portion;

whereby axial rotation of the shaft is prevented, but rotation of the shaft about other axes is allowed;

wherein the anti-rotation clip is of multi-piece construction; and wherein the wall portion comprises:

a first portion having a center channel and a side member, the side member having a planar portion and a corner portion, the corner portion being integrated with the center channel and the planar portion, the side member having an inner surface, the restraining member protruding inwardly from the inner surface of the side member; and a second portion identical to the first portion.

12. The anti-rotation clip according to claim 11, wherein the wall portion and the restraining member are made of nylatron.

13. An anti-rotation clip comprising:

a wall portion; and a restraining member protruding inwardly from the wall portion;

whereby axial rotation of the shaft is prevented, but rotation of the shaft about other axes is allowed;

wherein the anti-rotation clip is of multi-piece construction; and wherein the wall portion comprises:

a first portion;

a second portion identical to the first portion, both the first portion and the second portion having a center channel, each center channel having a bottom surface and a top surface, the bottom surface of the center channel of the first portion adapted to mate with the bottom surface of the center channel of the second portion, each center channel having an aperture extending from the top surface to the bottom surface, each aperture adapted to align with the other aperture upon making of the first portion and the second portion, each aperture adapted to receive a connecting member upon alignment with the other aperture thereby joining the first portion and the second portion;

the first portion and the second portion each having a side member, each side member having a planar portion and a corner portion, the corner portion being integrated with the center channel and the planar portion, the planar portion having an arcuate cutout forming at least one leg; and the side member having an inner surface, the restraining member protruding inwardly from the inner surface of the side member.

14. A method of limiting a rotation of a shaft held between two clevis arms, the method comprising the steps of:

providing a multi-piece anti-rotation clip for restraining the axial rotation of the shaft, the anti-rotation clip having a wall portion and at least one restraining member protruding inwardly from the wall portion, comprising the steps of:

providing a first portion having a center channel, a side member, and the at least one restraining member, the center channel having a bottom surface and a top surface, the center channel having an aperture extending from the top surface to the bottom surface, the side member having a planar portion and a corner portion, the corner portion being integrated with the center channel and the planar portion, the planar portion having an arcuate cutout forming at least one leg, the side member having an inner surface, the at least one restraining member protruding inwardly from the inner surface of the side member;

providing a second portion identical to the first portion;

aligning the aperture of the first portion with the aperture of the second portion;

mating the bottom surface of the center channel of the first portion with the bottom surface of the center channel of the second portion; and connecting the first portion to the second portion using a connecting member passing through the aperture of the first portion and the aperture of the second portion; and disposing the anti-rotation clip between the clevis arms such that the at least one restraining member limits the axial rotation of the shaft between the clevis arms.

15. A method of preventing wear in an existing rotating control system having an existing clevis member formed by a plurality of existing clevis arms and an existing shaft pivotally coupled to at least two of the clevis arms, the method comprising the steps of:

providing an anti-rotation clip having a wall portion and at least one restraining member protruding inwardly from the wall portion, comprising the steps of:

providing a two-piece anti-rotation clip, the anti-rotation clip having a first portion and a second portion, the second portion being identical to the first portion, both the first portion and the second portion having a center channel, each center channel having a bottom surface and a top surface, the bottom surface of the center channel of the first portion adapted to mate with the bottom surface of the center channel of the second portion, each center channel having an aperture extending from the top surface to the bottom surface, the first portion and the second portion each having a side member, each side member having a planar portion and a corner portion, the corner portion being integrated with the center channel and the planar portion, the planar portion having an arcuate cutout forming at least one leg, the side member having an inner surface, the at least one restraining member protruding inwardly from the inner surface of the side member; and disposing the anti-rotation clip between the at least two of the clevis arms such that the at least one restraining member limits axial rotation of the existing shaft thereby preventing wear.

16. The method according to claim 15, wherein the existing shaft is removed from the existing clevis arms prior to disposing the anti-rotation clip between the at least two of the clevis arms.

17. The method according to claim 15, wherein the step of disposing the anti-rotation clip between the at least two of the clevis arms comprises the steps of:

disposing the first portion of the anti-rotation clip between the existing clevis arms;

disposing the second portion of the anti-rotation clip between the existing clevis arms such that the bottom surface of the center channel of the second portion mates with the bottom surface of the center channel of the first portion;

aligning the aperture of the first portion with the aperture of the second portion; and disposing a connecting member through the aperture of the first portion and the aperture of the second portion such that the first portion is releasably connected to the second portion such that the existing shaft remains connected to the existing clevis arms.

18. A rotating control system comprising:

a member having at least one clevis defined by a pair of clevis arms disposed in a clevis plane, the at least one clevis having an axis of symmetry disposed in the clevis plane midway between the pair of clevis arms;

a shaft member pivotally coupled between the pair of clevis arms, the shaft member having a shaft axis, the shaft axis disposed axially along the shaft member; and an anti-rotation member for limiting a rotation of the shaft member about the shaft axis, the anti-rotation member having at least one restraining member that protrudes toward the shaft member for limiting rotation of the shaft member about the shaft axis;

wherein the anti-rotation member is a multi-piece clip comprising:
a first portion having a center channel, a side member, and a restraining member, the side member having a planar portion and a corner portion, the corner portion being integrated with the center channel and the planar portion, the side member having an inner surface, the restraining member protruding inwardly from the inner surface of the side member; and
a second portion identical to the first portion.

19. A rotating control system comprising:

a member having at least one clevis defined by a pair of clevis arms disposed in a clevis plane, the at least one clevis having an axis of symmetry disposed in the clevis plane midway between the pair of clevis arms;

a shaft member pivotally coupled between the pair of clevis arms, the shaft member having a shaft axis, the shaft axis disposed axially along the shaft member; and an anti-rotation member for limiting a rotation of the shaft member about the shaft axis, the anti-rotation member having at least one restraining member that protrudes toward the shaft member for limiting rotation of the shaft member about the shaft axis;

wherein the anti-rotation member is a multi-piece clip comprising:
a first portion having a center channel, a side member, and a restraining member, the side member having a planar portion and a corner portion, the corner portion being integrated with the center channel and the planar portion, the planar portion having an arcuate cutout forming at least one leg;
a second portion identical to the first portion;
the center channel of the first portion and the center channel of the second portion each having a bottom surface and a top surface;
the bottom surface of the center channel of the first portion being adapted to mate with the bottom surface of the center channel of the second portion;
each center channel having an aperture extending from the top surface to the bottom surface such that the apertures align upon mating of the first portion and the second portion;
each aperture adapted to receive a connecting member such that the first portion and the second portion are releasably connected; and
the first portion and the second portion combining to form an inner surface, each restraining member protruding inwardly from the inner surface.

20. An anti-rotation clip for restraining the rotation of a shaft, the anti-rotation clip comprising:

a wall portion; and a restraining member protruding inwardly from the wall portion;

wherein the anti-rotation clip is of multi-piece construction; and wherein the wall portion comprises:
a first portion having a center channel and a side member, the side member having a planar portion and a corner portion, the corner portion being integrated with the center channel and the planar portion, the side member having an inner surface, the restraining member protruding inwardly from the inner surface of the side member; and
a second portion identical to the first portion.

21. An anti-rotation clip for restraining the rotation of a shaft, the anti-rotation clip comprising:

a wall portion; and a restraining member protruding inwardly from the wall portion;

wherein the anti-rotation clip is of multi-piece construction; and wherein the wall portion comprises:
a first portion;
a second portion identical to the first portion, both the first portion and the second portion having a center channel, each center channel having a bottom surface and a top surface, the bottom surface of the center channel of the first portion adapted to mate with the bottom surface of the center channel of the second portion, each center channel having an aperture extending from the top surface to the bottom surface, each aperture adapted to align with the other aperture upon mating of the first portion and the second portion, each aperture adapted to receive a connecting member upon alignment with the other aperture thereby joining the first portion and the second portion;
the first portion and the second portion each having a side member, each side member having a planar portion and a corner portion, the corner portion being integrated with the center channel and the planar portion, the planar portion having an arcuate cutout forming at least one leg; and the side member having an inner surface, the restraining member protruding inwardly from the inner surface of the side member.

22. A method of limiting a rotation of a shaft held between two clevis arms, the method comprising the steps of:

providing an anti-rotation clip for restraining the rotation of the shaft, the anti-rotation clip having a wall portion and at least one restraining member protruding inwardly from the wall portion; and disposing the anti-rotation clip between the clevis arms such that the at least one restraining member limits the rotation of the shaft between the clevis arms;

wherein the step of providing an anti-rotation clip for restraining the rotation of the shaft is accomplished by providing a multi-piece anti-rotation clip; and wherein the step of providing an anti-rotation clip for restraining the rotation of the shaft comprises the steps of:

providing a first portion having a center channel, a side member, and the at least one restraining member, the center channel having a bottom surface and a top surface, the center channel having an aperture extending from the top surface to the bottom surface, the side member having a planar portion and a corner portion, the corner portion being integrated with the center channel and the planar portion, the planar portion having an arcuate cutout forming at least one leg, the side member having an inner surface, the at least one restraining member protruding inwardly from the inner surface of the side member;

providing a second portion identical to the first portion;

aligning the aperture of the first portion with the aperture of the second portion;

mating the bottom surface of the center channel of the first portion with the bottom surface of the center channel of the second portion; and connecting the first portion to the second portion using a connecting member passing through the aperture of the first portion and the aperture of the second portion.

23. A method of preventing wear in an existing rotating control system having an existing clevis member formed by a plurality of existing clevis arms and an existing shaft pivotally coupled to at least two of the clevis arms, the method comprising the steps of:

providing an anti-rotation clip having a wall portion and at least one restraining member protruding inwardly from the wall portion; and disposing the anti-rotation clip between the at least two of the clevis arms such that the at least one restraining member limits a rotation of the existing shaft thereby preventing wear;

wherein the step of providing an anti-rotation clip is accomplished by providing a two-piece anti-rotation clip, the anti-rotation clip having a first portion and a second portion, the second portion being identical to the first portion, both the first portion and the second portion having a center channel, each center channel having a bottom surface and a top surface, the bottom surface of the center channel of the first portion adapted to mate with the bottom surface of the center channel of the second portion, each center channel having an aperture extending from the top surface to the bottom surface, the first portion and the second portion each having a side member, each side member having a planar portion and a corner portion, the corner portion being integrated with the center channel and the planar portion, the planar portion having an arcuate cutout forming at least one leg, the side member having an inner surface, the at least one restraining member protruding inwardly from the inner surface of the side member.

24. The method according to claim 23, wherein the step of disposing the anti-rotation clip between the at least two of the clevis arms comprises the steps of:

disposing the first portion of the anti-rotation clip between the existing clevis arms;

disposing the second portion of the anti-rotation clip between the existing clevis arms such that the bottom surface of the center channel of the second portion mates with the bottom surface of the center channel of the first portion;

aligning the aperture of the first portion with the aperture of the second portion; and disposing a connecting member through the aperture of the first portion and the aperture of the second portion such that the first portion is releasably connected to the second portion such that the existing shaft remains connected to the existing clevis arms.

* * * * *